United States Patent [19]
Dunn et al.

[11] Patent Number: 5,370,507
[45] Date of Patent: Dec. 6, 1994

[54] RECIPROCATING CHEMICAL PUMPS

[75] Inventors: Michael R. Dunn, Sandy; Gregory D. Moss, West Valley City, both of Utah

[73] Assignee: Trebor Incorporated, West Jordan, Utah

[21] Appl. No.: 14,823

[22] Filed: Jan. 25, 1993

[51] Int. Cl.$^5$ .......................... F04B 45/00; F16L 3/04
[52] U.S. Cl. ...................... 417/389; 417/395; 417/566; 92/1; 285/158; 285/356; 137/533.15
[58] Field of Search ....................... 137/533.11, 533.15; 477/413, 566, 389, 395; 285/220, 158, 356; 42/1

[56] References Cited

U.S. PATENT DOCUMENTS

| | | | |
|---|---|---|---|
| 149,438 | 4/1874 | Callahan | 285/356 |
| 2,332,354 | 10/1943 | Stecher | 285/356 |
| 2,775,471 | 12/1956 | Douglass | 285/356 |
| 3,029,743 | 4/1962 | Johns | 417/413 R |
| 3,074,346 | 1/1963 | Jackson | 471/413 R |
| 3,285,270 | 11/1966 | Klinefelter | 137/533.15 |
| 3,496,874 | 2/1970 | Findlay | 417/413 R |
| 4,781,213 | 11/1988 | Kilayko | 137/533.15 |
| 4,886,429 | 12/1989 | Osada et al. | 417/413 R |
| 5,074,757 | 12/1991 | Horn | 417/413 R |
| 5,213,485 | 5/1993 | Wilden | 417/395 |

FOREIGN PATENT DOCUMENTS

| | | | |
|---|---|---|---|
| 107280 | 5/1987 | Japan | 417/566 |
| 888985 | 10/1957 | United Kingdom | 137/533.15 |

Primary Examiner—Richard A. Bertsch
Assistant Examiner—Roland G. McAndrews, Jr.
Attorney, Agent, or Firm—Terry M. Crellin

[57] ABSTRACT

Chemical pumps are disclosed in which all parts wetted by the fluid being pumped are made of fluoroplastic material, with the pumps having check valves that include floating ball members and O-rings positioned adjacent to the floating ball members. The retainer area in which the O-ring is received has a diameter that is at least about 0.01 inch larger that the diameter of the O-ring so as to allow the O-ring to move slightly. The intake and discharge ports of the pumps comprise a bore extending into the body of the pump, with a threaded counterbore formed concentric with the bore to form a flat, annular surface between the bore and the counterbore at the inner end of the counterbore. A threaded fitting is received in the counterbore, and a seal is formed by compressing an O-ring against the annular surface at the inner end of the counterbore. The head of the pump is secured to the body thereof using spring type means that either (1) continuously applies a spring force against the head to force the head into sealing engagement with the body of the pump or (2) forms an expanding spring seal between the head and the body of the pump.

26 Claims, 3 Drawing Sheets

RECIPROCATING CHEMICAL PUMPS

BACKGROUND OF THE INVENTION

1. Field of the Invention

The present invention relates to improvements in reciprocating pumps and in particular to improvements in (1) seals used for check valves in such pumps, (2) fittings for suction and discharge ports and (3) retainers for securing the heads of such pumps to the bodies thereof.

2. State of the Art

In the manufacturing of integrated circuit chips, it has been necessary because of cleanliness requirements and the corrosive nature of the chemicals used to employ chemical pumps that are formed from fluoroplastic materials such as polytetrafluoroethylene. All surfaces of the pumps that are wetted by the chemicals being pumped are formed from the fluoroplastic material. It is advantageous to form the body and heads of such pumps from the fluoroplastic material. The surfaces of all flow channels and pumping chambers which are formed in the body and heads will then, of course, be formed of the fluoroplastic material.

However, three major problems as will be identified below have been encountered in making the chemical pumps from fluoroplastic material. The chemicals being pumped are usually maintained at elevated temperatures, and the three problems are all related to the fact that fluoroplastic materials are subject to plastic deformation and creep at elevated temperatures. The problems are caused because parts of the pump made of fluoroplastic material and which are subject to stress of pressure or other forces tend to distort and change slightly in their shape over time.

The first problem involves leakage in check valve seals used in the pumps. When seal areas in the passages of the pumps distort even slightly, the check seals are likely to malfunction and leak. The second problem involves leakage at fittings on the suction and discharge ports of the pumps. Fittings on the suction and discharge ports, which have generally been threaded into corresponding threaded bores in the body of the pump, specifically tapered pipe threads, often fail or leak due to the distortion of the fluoroplastic material in the area of the threaded bores. The third problem involves leakage at the interface of the heads and bodies of such pumps. Seals around the head and body of the pumps tend to malfunction and leak due to the distortion of the fluoroplastic material due to elevated temperature, pressure and forces used in connecting the head of the pump securely to the body of the pump.

3. Objectives

The principal objective of the invention is to provide improvements in chemical pumps that are made of a fluoroplastic material wherein the improvements eliminate or at least greatly reduce the failures as discussed above due to inherent distortion and creep of the fluoroplastic material.

A particular objective of the present invention is to provide an improved floating O-ring seal in the intake and discharge portions of the pump, wherein the floating nature of the O-ring accommodates small changes in the shape of the retainer means used in positioning the O-ring whereby the O-ring is not subject to distortion by the retainer means and the O-ring makes a fluid tight seat with the check valve.

Another objective of the present invention is to provide novel fittings for suction and discharge ports that in addition to accommodating distortion or creep in the body of the pump also allows various types of fittings to be attached to the body of the pump.

A further objective of the present invention is to provide novel improved means for retaining and securing the heads of the pumps to the bodies thereof which obviates malfunction and leaking due to distortion and creed of the material from which the body and the head of the pump are formed.

BRIEF DESCRIPTION OF THE INVENTION

The above objectives are achieved in accordance with the present invention by providing novel improvements in a pump having a pump chamber operating on a cycle comprising first and second stages, wherein fluid being pumped is drawn into the pump chamber during the first stage and is expelled from the pump chamber during the second stage. One improvement provided by the present invention is in the check valves forming the suction and discharge valves of the pump. Such check valves conventionally include floating ball members positioned in the respective suction or discharge flow channels of the pump. O-rings are positioned in the respective flow channels adjacent to the floating ball members, and retainer means are associated with each flow channel for retaining the respective O-ring in proper position in that flow channel.

In prior art pumps, the retainer means generally comprises a recess formed in the body of the pump. The O-ring is received in the recess and the recess was sized such that the O-ring fit snugly against the outer perimeter of the recess. Any distortion or creep of the fluoroplastic material in which the recess was formed tended to distort the recess and the O-ring positioned in the recess. Distortion of the O-ring caused malfunctioning of the seal between the O-ring and the floating ball member.

In accordance with the present invention, an improvement is provided that eliminates the distortion of the O-ring even when the recess in which the O-ring is positioned undergoes significant distortion. The improvement comprises forming the recess in which each O-ring is to be received such that the diameter of the outer perimeter wall of the recess is at least about 0.01 inch larger than the diameter of the outside perimeter of the O-ring which is to be received therein. The thickness of the recess is at least as great as the thickness of the O-ring. This allows the O-ring to float or move slightly, but the O-ring will automatically position itself in the slightly oversized recess so as to make a fluid tight seal with the floating ball member. In addition, distortion of the O-ring retainer means, i.e., the recess in which the O-ring is received, will not distort the O-ring, and again the O-ring will adjust its position so as to make a fluid tight seal with the floating check valve.

In a closely related improvement, improved means for attaching a suction or discharge flow conduit to the body of the pump is provided. The structure for the improved means comprises a bore extending into the body of the pump. A counterbore is formed about the bore, with the counterbore having a cylindrical side wall formed into the body of the pump, with the counterbore being concentric with the bore. A substantially flat annular surface is formed between the counterbore and the bore at an inner end of the counterbore.

Internal threads are formed on the cylindrical side wall of the counterbore, and an O-ring is positioned in the counterbore so as to lie around and along the flat annular surface at the inner end of the counterbore. A fitting having external threads is threaded into the internal threads of the counterbore, with a seal being formed by compressing the O-ring against the flat annular surface on the body of the pump at the inner end of the counterbore. The O-ring can be engaged by the leading end of the fitting or an auxiliary fitting that is received between the threaded fitting and the O-ring. Various well known attachment means can be associated with the threaded fitting or the auxiliary fitting for attaching a flow conduit to the fitting or auxiliary fitting and thus to the pump.

With the sealing of the fitting or auxiliary fitting being made by the O-ring at the inner end of the counterbore rather than by the engagement between the threads of the fitting and the counterbore, small distortion of the counterbore due to creep associated with the fluoroplastic material from which the pump is formed will not cause the fitting to malfunction or leak. Leakage around the threads of the fitting and counterbore is totally eliminated inasmuch as the threads are not used to form a seal between the fitting and the body of the pump. Instead, the O-ring at the inner end of the counterbore forms a seal between the fitting or auxiliary fitting and the body of the pump.

In another improvement in accordance with the present invention, means are provided for securing the head and body of the pump together, wherein distortion of the fluoroplastic material of the body and/or head of the pump will not result in malfunction of the seal between the head and the body of the pump. This improvement is probably the most significant of the three improvements disclosed herein. This last improvement relates to a pump of the type having a body made of a fluoroplastic material, with a chamber formed adjacent one side of the body, wherein the chamber is open at the one side of the body. This type of pump further has a head that encloses the chamber in the body, and a diaphragm is positioned between the body and head. Generally, a chamber will be formed in the head adjacent to the side of the head facing the diaphragm, and the chamber in the head is further substantially concentric with the chamber in the body of the pump.

Improved means are provided for securing the head to the body and sealing the diaphragm between the body and the head. Heretofore, means such as tie bolts running through the body and head have been used to cinch the head against the body and form a seal between mating, machined surfaces on the head and body. A seal ring, such as a conventional O-ring, could be positioned between the head and body to form the seal. However, as the fluoroplastic material of the body of the pump crept, due to heat and force applied by the tie bolts, the tension in the tie bolts would decrease to where the seal between the head and body of the pump would fail. Repeated tightening of the tie bolts was required to maintain a seal, and ultimately, the distortion in the body of the pump would result in general failure of the pump.

In accordance with the present invention, improved means for securing the head to the body and sealing the diaphragm between the body and the head comprises a torus ring made of resilient, elastomeric material. As used throughout the specification and claims, the term torus ring is meant to encompass a ring having a circular cross-sectional shape as well as other cross-sectional shapes such as the crosssectional shape shown in the drawings. The torus ring is positioned between the diaphragm and either the side of the head facing the diaphragm or the face of the body facing the diaphragm. The torus ring has a diameter of sufficient size to encircle the open ends of the chambers or chambers in the body and in the head. Means, such as conventional tie bolts, are provided for drawing the head toward the body so as to compress the torus ring between the head and the body. However, the torus ring is of such thickness that the head never comes in direct contact with the body. Accordingly, any expansion or contraction of the body and head due to temperature fluctuations and creep in the fluoroplastic material is accommodated by the compression of the torus ring between the head and the body without impairing the sealing of the diaphragm between the body and the head.

In a modified embodiment, a conventional, relatively thin, O-ring can be used in place of the resilient torus ring. However, because the thin O-ring cannot compensate for expansion and contraction of the body and head due to temperature fluctuations and creep in the fluoroplastic material from which the body of the pump is made, other means of accommodating such expansion and contraction must be provided. External springs can be associated with the tie bolts to provide a constant spring force biasing the head against the O-ring and body of the pump so as to accommodate expansion and contraction of the body and head of the pump.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENTS

Figure 1:
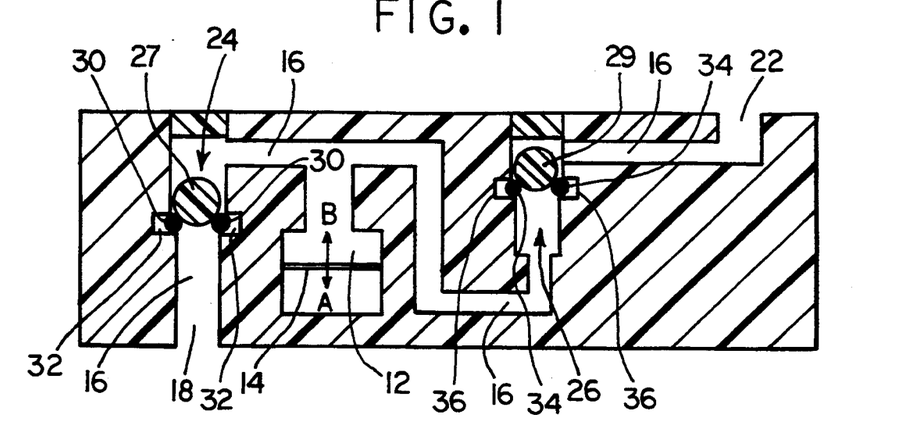
FIG. 1 is a diagrammatic representation of a pump incorporating one of the improvements of the present invention.

Referring now in particular to FIG. 1 of the drawings, there is shown a diagrammatic representation of a reciprocating, chemical pump in accordance with the present invention. The pump is of a conventional type having a pump chamber 12 that operates on a cycle comprising first and second stages. Fluid to be pumped is drawn into the pump chamber 12 during the first stage and is expelled from the pump chamber 12 during the second stage. The pump is preferably a pneumatic diaphragm pump in which all parts of the pump that are wetted by the fluid being pumped are made of fluoroplastic material.

As illustrated in FIG. 1, the pump is of the diaphragm type. The diaphragm 14 is adapted to flex back and forth along the double arrowed line shown in FIG. 1. Such diaphragm pumping action is well known in the prior art. A fluid flow passage 16 extends from the intake port 18 to a pump chamber 12 that is adjacent to one side of the diaphragm 14. The fluid flow passage 16 also communicates with the discharge port 22. Check valves 24 and 26, as will be further discussed hereinafter, are located in the intake portion and discharge portion of the fluid flow passage 16, respectively.

In the first stage of the operating cycle, and as the diaphragm 14 is drawn in a direction A of the double arrowed line, the pump chamber 12 is increased in its effective volume. The check valve 24 opens to allow fluid to pass through the fluid flow passage 16 from the intake port 18 to the chamber 12 of the pump. The check valve 26 remains closed during the intake stroke of the diaphragm 14. In the second stage of the operating cycle, and as the diaphragm 14 is drawn in a direction B of the double arrowed line, the pump chamber 12 contracts or is decreased in its effective volume. During this stage, the check valve 24 closes and the check valve 26 opens allowing fluid to be discharged through the fluid flow passage 16 to the discharge port 22 of the pump.

In accordance with one embodiment of the present invention, an improvement in the suction and discharge valves 24 and 26 are provided. Check valve 24 comprises a floating suction valve member (shown as ball 27) positioned in the suction flow portion of the fluid flow passage of channel 16 that extends between an intake or suction port 18 and the pump chamber 12. As well known in such pumps, the floating suction valve member 27 allows fluid being pumped to flow past the floating suction valve member 27 during the first stage of the operating cycle of the pump chamber 12.

A suction side O-ring 30 is positioned in the suction flow portion of the fluid flow channel 16 between the floating suction valve member 27 and the suction port 18 of the pump. The floating suction valve member 27 contacts the suction side O-ring 30 and forms a seal with the suction side O-ring 30 during the second stage of the operating cycle of the pump chamber 12.

A suction side retainer means is associated with the suction flow portion of the fluid flow channel 16 for retaining the suction side O-ring 30 in proper position in the flow channel 16. As illustrated, the suction side retainer means comprises a suction side annular recess 32 associated with the suction flow portion of the fluid flow channel 16. The suction side O-ring 30 is received in the suction side annular recess 32 whose annular perimeter wall is substantially coaxial with the suction flow portion of the fluid flow channel 16. The annular recess 32 is further defined by first and second spaced apart retaining surfaces that extend from the annular perimeter wall toward the centerline of the suction flow portion of the flow channel 16, with the second retaining surface being downstream of the first retaining surface as fluid flows from the suction port 18 to the pump chamber 12.

The diameter of the annular perimeter wall of the recess 32 is at least about 0.01 inch larger than the diameter of the outside perimeter of the O-ring 30, and the spacing between the first and second retaining surfaces of the annular recess 32 is at least as great as the thickness of the O-ring 30. The second retaining surface extends inwardly from the annular perimeter wall of the recess 32 by a distance smaller than the thickness of the O-ring 30.

The floating discharge valve member (ball 29 as illustrated) is positioned in a discharge portion of the fluid flow passage or channel 16 that extends between a discharge port 22 and the pump chamber 12. As well known in such pumps, the floating discharge valve member 29 allows fluid being pumped to flow past the floating discharge valve member 29 during the second stage of the operating cycle of the pump chamber 12.

A discharge side O-ring 34 is positioned in the discharge flow portion of the fluid flow channel 16 between the floating discharge valve member 29 and the pump chamber 12 of the pump. The floating discharge valve member 29 contacts the discharge side O-ring 34 and forms a seal with the discharge side O-ring 34 during the first stage of the operating cycle of the pump chamber 12.

A discharge side retainer means is associated with the discharge flow portion of the fluid flow channel 16 for retaining the discharge side O-ring 34 in proper position in the flow channel 16. As illustrated, the discharge side retainer means comprises a discharge side annular recess 36 associated with the discharge flow portion of the fluid flow channel 16. The discharge side O-ring 34 is received in the discharge side annular recess 36 whose annular perimeter wall that is substantially coaxial with the discharge flow portion of the fluid flow channel 16. The annular recess 36 is further defined by third and fourth spaced apart retaining surfaces that extend from the second annular perimeter wall of the recess 36 toward the centerline of the discharge flow portion of the flow channel 16, with the fourth retaining surface being downstream of the third retaining surface as fluid flows from the pump chamber 12 to the discharge port 22.

The diameter of the annular perimeter wall of recess 36 is at least about 0.01 inch larger than the diameter of the outside perimeter of the discharge side O-ring 34, and the spacing between the third and fourth retaining surfaces of the annular recess 36 is at least as great as the thickness of the discharge side 0-ring 34. The third retaining surface of the annular recess 36 extends inwardly from the annular perimeter wall of the recess 36 by a distance smaller than the thickness of the discharge side O-ring 34.

As can be seen at least diagrammatically in FIG. 1, the annular recesses 32 and 36 that retain the O-rings 30 and 34 have an outer perimeter that is slightly greater than the outer diameter of the respective O-rings. This allows each O-ring to float back and forth in its respective recess. To allow free movement of each O-ring, the spaced apart retaining walls of each recess must be spaced by a distance at least as great as the thickness of the respective O-ring positioned therein as mentioned previously. The limited free movement of the respective O-rings has been found to allow the O-rings to make automatic adjustment to seal with the check valve members 27 and 29.

Further, it has been unexpectedly found that the limited movement of the O-rings 32 and 36 will accommodate creep and resulting distortion in the fluoroplastic material from which the body of the pump is made. With prior art pumps, the O-rings are received snugly within a retaining area whose perimeter wall abuts the perimeter of the O-ring. In the prior art pumps, any distortion in the body of the pump that distorts the O-ring retaining area must also result in distortion of the O-ring. The distorted O-ring can then no longer make adequate sealing contact with the check valve, and fluid leaks or bypasses the ball in the check valve when in fact the ball should be sealed so as to prevent such leakage. With the improvement of the present invention, the O-rings are not constrained by the retainer areas or recesses, and as the body of the pump undergoes creep and distortion, the retainer areas or recesses may be distorted. However, even if the retainer areas or recesses become distorted, the O-rings maintain their proper shape and continue to make sealing engagement with the ball in the check valve.

Figure 2:
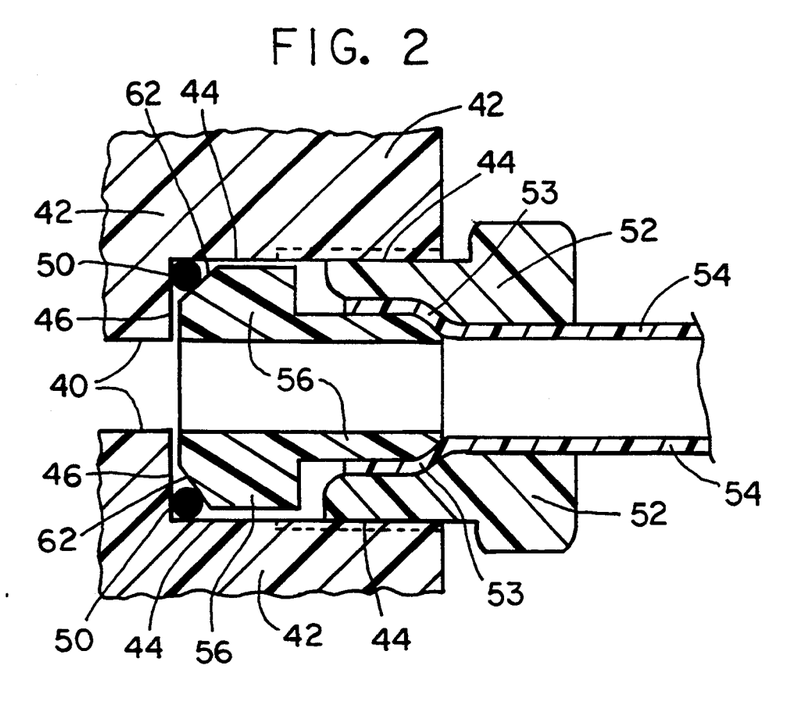
FIG. 2 is a cross section through a port, either a suction port or discharge port, of a pump in accordance with the present invention showing one preferred embodiment of an improved fitting for attaching a flared tube to the port of the pump.
Figure 3:
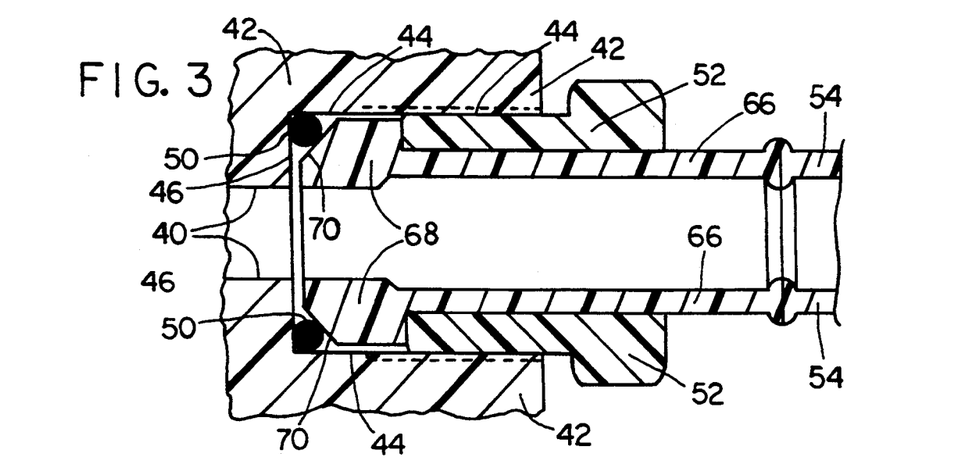
FIG. 3 is a view similar to that of FIG. 2 but showing another preferred embodiment of an improved fitting for attaching a tube base to the pump wherein the tube base is adapted to have a corresponding tube heated bonded thereto.
Figure 4:
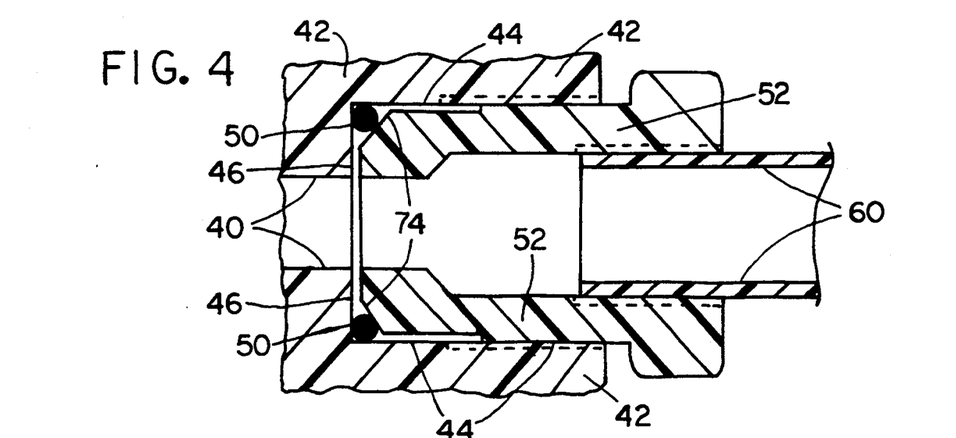
FIG. 4 is a view similar to that of FIG. 2 but showing another preferred embodiment of an improved fitting in which a threaded end of a tube can be threaded into the fitting.

As mentioned previously, the reciprocating pump is preferably of the type having a body made of fluoroplastic material. In such pumps, the present invention provides a further improvement in means for attaching a suction or discharge flow conduit to the body of the pump. Three embodiments of such improvements are shown in FIGS. 2-4 of the drawings. In each of the embodiments of FIGS. 2-4, the improvement comprises a bore 40 extending into the body 42 of the pump, wherein the body 42 is made of a fluoroplastic material. A counterbore 44 is provided having a cylindrical side wall formed in the body 42 concentric with the bore 40. A substantially flat annular surface 46 is formed between the counterbore 44 and the bore 40 at an inner end of the counterbore 44. Internal threads are formed on the cylindrical side wall of the counterbore 44, and an O-ring 50 is positioned in the counterbore 44 so as to lie around and along the flat annular surface 46 at the inner end of the counterbore 44.

A fitting 52 having external threads is threaded into the counterbore 44. Means are associated with the fitting 52 for attaching a flow conduit 54 to the fitting 52, and means are also associated with the fitting 52 for engaging the O-ring 50 so as to form a seal at the inner end of the counterbore 44. In the embodiment shown in FIG. 2, the fitting 52 has an internal bore extending through the fitting 52 from an outer end thereof to an internal end thereof that is received in the counterbore 44. The internal bore in the fitting 52 has a flared opening 53 facing the inner end of the counterbore 44.

The means associated with the fitting 52 for attaching a flow conduit to the fitting 52 comprises an insert flare 56 having a cylindrical nipple extending upwardly from an enlarged cylindrical base. The cylindrical nipple has an outer diameter that slips inside the flared opening 53 of the internal bore of the fitting 52, and the cylindrical base of the insert flare 56 has an outer diameter that fits in the counterbore 44 at the inner end of the counterbore 44. The means associated with the fitting 52 for engaging the O-ring 50 comprises an annular, substantially flat surface 62 on the cylindrical base of the insert flare 56 that engages the O-ring 50 to form a seal therewith.

In the embodiment of FIG. 2, as the fitting 52 is threaded into the counterbore 44, the fitting 52 forces the flared end of the tube 54 that is to be attached to the pump port against the outer end of the nipple of the insert flare 56. The flared end of the tube 54 makes sealing engagement with the outer end of the nipple of the insert flare 56, and the inner surface 62 of the insert flare 56 is forced into sealing engagement with the O-ring 50 which in turn makes sealing engagement with the flat inner surface 46 of the counterbore 44. In this embodiment, if the body 42 of the pump undergoes creep and deformation, the deformation will not be so great as to disrupt the threaded engagement of the fitting 52 in the counterbore 44. The force remains on the flared end of the tube 54 and between the insert flare 56 and the O-ring 50. Leakage past the O-ring 50 or between the nipple of the insert flare 56 and the flared end of the tube 54 will not occur.

In the embodiment shown in FIG. 3, the fitting 52 has an internal bore extending through the fitting 52 from an outer end thereof to an internal end thereof that is received in the counterbore 44. The means associated with the fitting 52 for attaching a flow conduit 54 to the fitting 52 comprises a cylindrical nipple 66 extending upwardly from an enlarged cylindrical base 68. The cylindrical nipple has an outer diameter that slips inside the bore of the fitting 52, and the cylindrical base 68 of the nipple 66 has an outer diameter that fits in the counterbore 44 at the inner end of the counterbore 44. The means associated with the fitting 52 for engaging the O-ring 50 comprises an annular, substantially flat surface 70 on the cylindrical base 68 of the nipple 66 that engages the O-ring 50 to form a seal therewith.

In the embodiment of FIG. 3, the fitting 52 is threaded into the threads of the counterbore 44, but this threaded engagement is not used as a liquid seal. Instead, the threaded fitting 52 forces the cylindrical base 68 against the O-ring 50 so as to form a seal between the O-ring and the base 68, while the O-ring 50 makes a further seal with the flat inner end 46 of the counterbore 44. As with the embodiment of FIG. 2, any distortion of the body 42 of the pump will not disrupt the threaded engagement of the fitting 52 in the counterbore 44, and continuous sealing between the O-ring 50 and the flat inner end 46 of the counterbore 44 and the surface 70 on the base 68 is maintained.

In the embodiment shown in FIG. 4, the fitting 52 has an internal bore extending from an outer end of the fitting 52 to an inner end of the fitting that is received in the counterbore 44. The means associated with the fitting 52 for attaching a flow conduit to the fitting 52 comprises screw threads (particularly tapered screw threads) on the cylindrical sidewall of the internal bore of the fitting 52. A flow conduit 60 having a threaded end can be screwed into the internal bore to form a seal between the flow conduit and the internal bore of the fitting. The means associated with the fitting 52 for engaging the O-ring 50 comprises an annular, substantially flat surface 74 on the inner end of the fitting 52 that engages the O-ring 50 to form a seal therewith.

In the embodiment of FIG. 4, the fitting 52 forms a seal by squeezing the O-ring 50 between the flat inner end 46 of the counterbore 44 and the surface 74 on the inner end of the fitting 52. The threaded engagement between the fitting 52 and the counterbore 44 is not relied on as a fluid seal. The fitting 52 will not deform sufficiently to break the fluid seal between the threaded engagement of the tube 60 with the internal threads on the fitting 52, even though distortion of the counterbore 44 in the body of the pump would be sufficient to break any fluid seal between the threaded portion of the fitting 52 and the counterbore 44 if such threaded engagement were to be utilized as the fluid seal.

Figure 5:
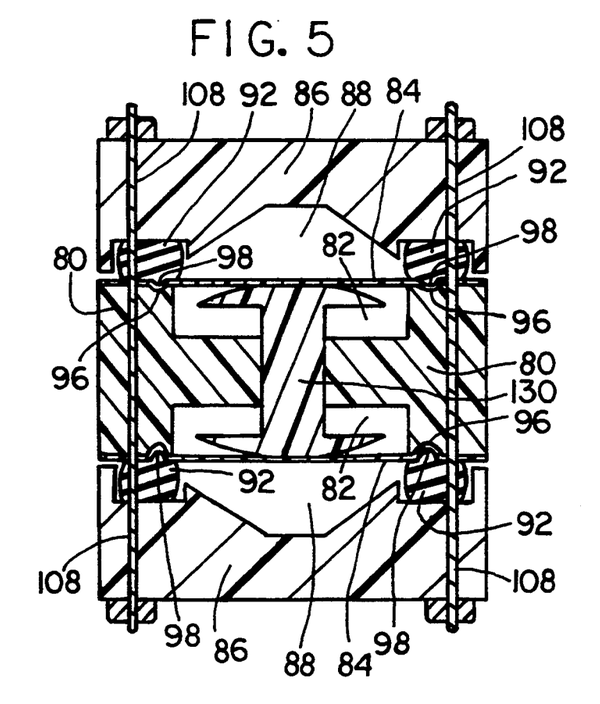
FIG. 5 is a diagrammatic cross section through a pump in accordance with the present invention showing one preferred embodiment of improved means for mounting a head to the body of the pump.
Figure 6:
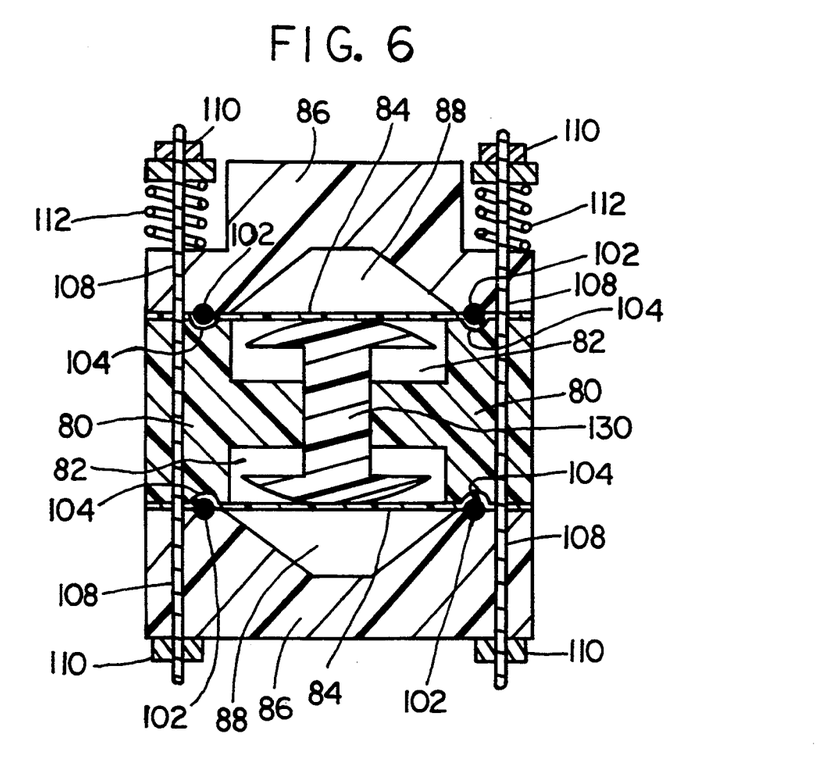
FIG. 6 is a view similar to that of FIG. 5 but showing a slightly modified embodiment of the improved means for mounting a head to the body of the pump.
Figure 7:
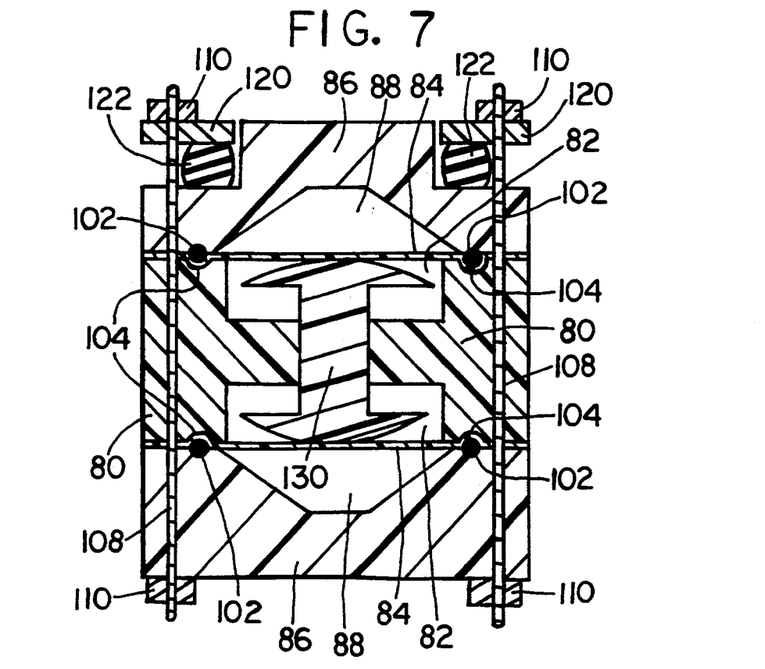
FIG. 7 is a view similar to that of FIGS. 5 and 6 but showing yet another modified embodiment of the improved means for mounting a head to the body of the pump.

A reciprocating pump is shown in FIGS. 5, 6 and 7 wherein the pump is of the type having a body 80 made of a fluoroplastic material such as polytetrafluoroethylene, with a chamber 82 formed adjacent to each side of the body 80. The chambers 82 are open at the respective sides of the body 80, and a diaphragm 84 fits over the otherwise open end of each chamber 82. A pair of heads 86 are provided at the opposite sides of the body 80, with the heads 86 having sides facing a respective diaphragm 84. A chamber 88 is formed in each head 86 adjacent to the side of the head 86 that faces a respective diaphragm 84. Each chamber 88 in the heads 86 is open at the side of the head 86 that faces a respective diaphragm 84. Each chamber 88 in the heads 86 is further substantially concentric with the corresponding chamber 82 in the body 80. An improvement in accordance with the present invention is provided in such a pump as shown in FIGS. 5, 6 and 7. The improvement relates to means for securing the heads 86 to the body 80 and for sealing each diaphragm 84 between the body 80 and a respective head 86.

As illustrated in FIG. 5, the improvement comprises a torus ring 92 made of resilient, elastomeric material. A torus ring 92 is positioned between each diaphragm 84 and the side of a respective head 86 facing such diaphragm. Each torus ring 92 has a diameter of sufficient size to encircle the open ends of the respective chambers in the body 80 and the heads 86. Means are provided for drawing the heads 86 toward the body 80 so as to compress each torus ring 92 between a respective head 86 and the body 80. The thickness of each torus ring 92 is sufficient that each respective head 86 does not contact the body 80. The heads 86 in essence float on the torus rings 92 out of contact with the body 80. Any creep resulting in expansion or contraction of the body 80 and heads 86 is accommodated by the compression of the torus rings 92 between each respective head 86 and the body 80 without impairing the sealing of the diaphragms 84 between the body 80 and the heads 86.

An annular recess 96 can advantageously be formed in each side of the body 80 so as to encircle the open ends of the respective chambers 82 in the sides of the body 80. An annular projection 98 is then formed on the side of each torus ring 92 that faces a respective diaphragm 84, with the annular projection 98 on each torus ring 92 mating with a respective annular recess 96 in an end of the body 80 to force the diaphragm 84 at that end of the body 80 into the annular recess 96 between the body 80 and the annular projection 98 on the respective torus ring 92.

It should be recognized that the diaphragms 84 of the pump shown in FIG. 5 could be positioned between the torus rings 92 and the heads 86 instead of between the torus rings 92 and the body 80 as illustrated in FIG. 5. If the diaphragms 84 were to be positioned between the torus rings 92 and the heads 86, the annular projection 98 of the torus rings 92 would project toward the heads 86, and the corresponding annular recesses 92, with which the annular projections 98 mate, would be formed on the side of the heads 86 facing the diaphragms 84 rather than on the sides of the body as illustrated in FIG. 5.

As shown in FIG. 6, a pump similar to that of FIG. 5 is shown, but the resilient torus rings 92 of the pump of FIG. 5 have been replaced with conventional O-rings, and a supplemental form of spring means is provided to take the place of the compression of the torus rings that have been replaced by the O-rings. Referring now to FIG. 6 an O-ring 102 which is made of resilient, elastomeric material is positioned between the diaphragms 84 and the sides of each of the heads 86 facing the diaphragms 84. The O-rings 102 have diameters of sufficient size to encircle the open ends of the chambers in the body 80 and in each head 86. Spring means are provided to exert a force against each of the heads 86 to force the heads 86 toward the body 80 and thereby compress each of the O-rings 102 between a respective head 86 and the body 80. Any expansion or contraction of the body 80 and heads 86 due to temperature fluctuations and creep in the fluoroplastic material from which the body 80 and heads 86 are formed is accommodated by the spring means without significant loss in compression of the O-rings 102 positioned between the heads 86 and the body 80.

As illustrated in FIG. 6 an annular recess 104 can be formed in each of the sides of either the body 80 or the heads 86 so as to encircle the open end of the chambers in the sides of the body 80 or heads 86. The annular recesses 104 have a depth that is less than the thickness of the corresponding O-rings 102. Each O-ring 102 mates with an annular recess 104 in an end of the body 80 or head 86 to force the corresponding diaphragm 84 into the annular recess 104 and to seal the diaphragm 84 between the recess 104 and a corresponding O-ring 102.

The spring means shown in FIG. 6 comprises tie bolts 108 that extend through openings in the body 80 and the head 86. The tie bolts 108 and beyond opposite sides of the heads 86 facing away from the body 80. Similar tie bolts 108 are used in the pump of FIG. 5 as the means for drawing the heads 86 of that embodiment toward the body 80. In the embodiment shown in FIG. 6, screw retainers 110 are threaded on end portions of the tie bolts 108 extending beyond the opposite side of the heads 86. Spring means, such as coil springs 112, are positioned between the screw retainers 110 and the heads 86 so as to exert spring force on each head 86 when the screw retainers 110 are tightened against the springs 112.

Another embodiment of spring means for retaining the heads 86 on the body 80 of the pump are shown in FIG. 7. The alternative embodiment of spring means shown in FIG. 7 comprises a rigid, annular compression ring 120 having openings spaced around the compression ring 120. The openings in the compression ring 120 align with the end portions of the tie bolts 108 that extend beyond the opposite sides of the heads 86. The tie bolts 108 pass through the openings in the compression ring so that the compression ring 120 is positioned between a corresponding head 86 and the screw retainers 110 threaded on the end portions of the tie bolts 82. An annular spring element 122 is positioned between the compression ring 120 and the head 86. The annular spring elements could be similar to the resilient torus rings 92 of the embodiment shown in FIG. 5. When the screw retainers 110 are tightened against the compression ring 120, the compression ring 120 compresses the annular spring element 122 such that a spring force is applied to the head 86.

The element shown by reference number 130 in FIGS. 5–7 is a push rod and complementary push plates which move back and forth with the diaphragms 84. The push rod and push plate element 130 and its operation are well known in the art and no further description is necessary.

Although preferred embodiments of the improvements in a chemical pump in accordance with the present invention have been illustrated and described, it is to be understood that the present disclosure is made by way of example and that various other embodiments are possible without departing from the subject matter coming within the scope of the following claims, which subject matter is regarded as the invention.

We claim:

1. In a reciprocating pump having a pump chamber operating on a cycle comprising first and second stages, wherein fluid being pumped is drawn into said pump chamber during the first stage and is expelled from said pump chamber during the second stage, an improvement in the suction and discharge valves thereof comprising a floating suction valve member positioned in a suction flow channel that extends between a suction port and the pump chamber of said pump, said floating suction valve member allowing fluid being pumped to flow by said floating suction valve member during the first stage of the operating cycle of said pump chamber;

a suction side O-ring positioned in said suction flow channel between said floating suction valve member and the suction port of said pump, wherein said floating suction valve member contacts said suction side O-ring and forms a seal with said suction side O-ring during the second stage of the operating cycle of said pump chamber;

suction side retainer means associated with said suction flow channel for retaining said suction side O-ring in proper position in said suction flow channel, said suction side retainer means comprising a suction side annular recess associated with said suction flow channel and in which the suction side O-ring is received, said suction side annular recess formed by an annular perimeter wall that is substantially coaxial with said suction flow channel and by first and second spaced apart retaining surfaces that extend from said annular perimeter wall toward the centerline of said suction flow channel, with (1) said second retaining surface being downstream of said first retaining surface as fluid flows from suction port to said pump chamber, (2) the diameter of said annular perimeter wall being at least about 0.01 inch larger than the diameter of the outside perimeter of said O-ring, (3) the spacing between the first and second retaining surfaces of said annular recess being at least as great as the thickness of said O-ring, and (4) said second retaining surface extending inwardly from said annular perimeter wall by a distance smaller than the thickness of said O-ring;

a floating discharge valve member positioned in a discharge flow channel that extends between a discharge port and the pump chamber of said pump, said floating discharge valve member allowing fluid being pumped to flow by said floating discharge valve member during the second stage of the operating cycle of said pump chamber;

a discharge side O-ring positioned in said discharge flow channel between said floating discharge valve member and the discharge port of said pump, wherein said floating discharge valve member contacts said discharge side O-ring and forms a seal with said discharge side O-ring during the second stage of the operating cycle of said pump chamber; and discharge side retainer means associated with said discharge flow channel for retaining said discharge side O-ring in proper position in said discharge flow channel, said discharge side retainer means comprising a discharge side annular recess associated with said discharge flow channel and in which the discharge side O-ring is received, said discharge side annular recess formed by a second annular perimeter wall that is substantially coaxial with said discharge flow channel and by third and fourth spaced apart retaining surfaces that extend from said second annular perimeter wall toward the centerline of said discharge flow channel, with (1) said fourth retaining surface being downstream of said third retaining surface as fluid flows from said pump chamber to said discharge port, (2) the diameter of said second annular perimeter wall being at least about 0.01 inch larger than the diameter of the outside perimeter of said discharge side O-ring, (3) the spacing between the third and fourth retaining surfaces of said discharge side annular recess being at least as great as the thickness of said discharge side O-ring, and (4) said third retaining surface of said discharge side annular recess extending inwardly from said second annular perimeter wall by a distance smaller than the thickness of said discharge side O-ring.

2. A reciprocating pump as claimed in claim 1 wherein the pump is a pneumatic diaphragm pump in which all parts of the pump that are wetted by the fluid being pumped are made of fluoroplastic material.

3. A reciprocating pump as claimed in claim 1 wherein the pump is of the type having (1) a body made of a fluoroplastic material, with a chamber formed adjacent one side of said body, wherein said chamber is open at said one side of said body, (2) a diaphragm fits over the otherwise open end of said chamber in said one side of said body and (3) a head having a side facing said diaphragm, with a chamber formed in said head adjacent to the side of said head facing said diaphragm, wherein the chamber in said head is open at said side of said head facing said diaphragm and is further substantially concentric with the chamber in said body, an improvement in means for securing said head to said body and sealing said diaphragm between said body and said head, said improvement comprising a torus ring made of resilient, elastomeric material, said torus ring being positioned between said diaphragm and the side of said head facing said diaphragm;

said torus ring having a diameter of sufficient size to encircle the open ends of the chambers in said body and in said head; and means for drawing said head toward said body so as to compress said torus ring between said head and said body but without having said head contact said body, whereby any expansion or contraction of the body and head due to temperature fluctuations is accommodated by the compression of the torus ring between said head and said body without impairing the sealing of said diaphragm between said body and said head.

4. A reciprocating pump as claimed in claim 3 wherein an annular recess is formed in said one side of said body so as to encircle said open end of said chamber in said one side of said body; and an annular projection is formed on the side of said torus ring that faces said diaphragm, with the annular projection on said torus ring mating with said annular recess in said one end of said body to force the diaphragm into said annular recess between said body and said annular projection on said torus ring.

5. A reciprocating pump as claimed in claim 1 wherein the pump is of the type having (1) a body having a chamber formed adjacent one side of said body, wherein said chamber is open at said one side of said body, (2) a head made of fluoroplastic material and having a side facing said body, with a chamber formed in said head adjacent to the side of said head facing said body, wherein the chamber in said head is open at said side of said head facing said body and is further substantially concentric with the chamber in said body, and (3) a diaphragm fits over the otherwise open end of said chamber in said one side of said head, an improvement in means for securing said head to said body and sealing said diaphragm between said body and said head, said improvement comprising a torus ring made of resilient, elastomeric material, said torus ring being positioned between said diaphragm and the side of said body facing said diaphragm;

said torus ring having a diameter of sufficient size to encircle the open ends of the chambers in said body and in said head; and means for drawing said head toward said body so as to compress said torus ring between said head and said body but without having said head contact said body, whereby any expansion or contraction of the body and head due to temperature fluctuations is accommodated by the compression of the torus ring between said head and said body without impairing the sealing of said diaphragm between said body and said head.

6. A reciprocating pump as claimed in claim 5 wherein an annular recess is formed in said one side of said head so as to encircle said open end of said chamber in said one side of said head; and an annular projection is formed on the side of said torus ring that faces said diaphragm, with the annular projection on said torus ring mating with said annular recess in said one end of said head to force the diaphragm into said annular recess between said dead and said annular projection on said torus ring.

7. A reciprocating pump as claimed in claim 1 wherein the pump is of the type having (1) a body having a chamber formed adjacent one side of said body, wherein said chamber is open at said one side of said body, (2) a head made of fluoroplastic material and having a side facing said body, with a chamber formed in said head adjacent to the side of said head facing said body, wherein the chamber in said head is open at said side of said head facing said body and is further substantially concentric with the chamber in said body, and (3) a diaphragm fits over the otherwise open end of said chamber in said one side of said head, an improvement in means for securing said head to said body and sealing said diaphragm between said body and said head, said improvement comprising an O-ring made of resilient, elastomeric material, said O-ring being positioned between said diaphragm and the side of said body facing said diaphragm;

said O-ring having a diameter of sufficient size to encircle the open ends of the chambers in said body and in said head; and spring means exerting a spring force against said head to force said head toward said body and thereby compress said O-ring between said head and said body, whereby any expansion or contraction of the body and head due to temperature fluctuations is accommodated by said spring means without significant loss in compression of the O-ring between said head and said body.

8. A reciprocating pump as claimed in claim 7 wherein an annular recess is formed in said one side of said head so as to encircle said open end of said chamber in said one side of said head; and said annular recess has a depth that is less than the thickness of said O-ring such that said O-ring mates with said annular recess in said one end of said head to force the diaphragm into said annular recess and to seal the diaphragm between said recess and said O-ring.

9. A reciprocating pump as claimed in claim 7 wherein tie bolts extend from said one side of said body through openings in said head and beyond an opposite side of said head facing away from said body;

screw retainers are threaded on end portions of said tie bolts extending beyond the opposite side of said head; and said spring means are positioned between said screw retainers and said opposite side of said head so as to exert spring force on said head when said screw retainers are tightened against said spring means.

10. A reciprocating pump as claimed in claim 9 wherein said spring means comprises a rigid, annular compression ring having openings spaced around said compression ring, said openings aligning with the end portions of said tie bolts that extend beyond the opposite side of said head;

said tie bolts pass through said openings in said compression ring such that said compression ring is positioned between said opposite side of said head and said screw retainers threaded on said end portions of said tie bolts; and an annular spring element is positioned between said compression ring and said opposite side of said head, whereby when said screw retainers are tightened against said compression ring, the compression ring compresses said annular spring element such that a spring force is applied to said opposite side of said head.

11. A reciprocating pump as claimed in claim 1 wherein the pump is of the type having a body made of fluoroplastic material, and wherein there is provided a further improvement in means for attaching a suction or discharge flow conduit to the body of the pump, said further improvement comprising a bore extending into said body;

a counterbore having a cylindrical side wall formed into the body concentric with said bore, with a substantially flat annular surface being formed between the counterbore and the bore at an inner end of said counterbore;

internal threads formed on the cylindrical side wall of said counterbore;

an O-ring positioned in said counterbore so as to lie around and along said flat annular surface at the inner end of said counterbore;

a fitting having external threads for engaging said internal threads of said counterbore;

means associated with said fitting for attaching a flow conduit to said fitting; and means associated with said fitting for engaging said O-ring so as to form a seal between the fitting and the counterbore.

12. A reciprocating pump as claimed in claim 11 wherein said fitting has an internal bore extending through the fitting from an outer end thereof to an internal end thereof that is received in said counterbore;

said internal bore in said fitting having a flared opening facing the inner end of said counterbore;

said means associated with said fitting for attaching a flow conduit to said fitting comprises an insert flare having a cylindrical nipple extending upwardly from an enlarged cylindrical base, wherein the cylindrical nipple has an outer diameter that slips inside the flared opening of the internal bore of said fitting and said cylindrical base of said insert flare has an outer diameter that fits in said counterbore at the inner end of said counterbore; and said means associated with said fitting for engaging said O-ring comprises an annular, substantially flat surface on the cylindrical base of said insert flare that engages said O-ring to form a seal therewith.

13. A reciprocating pump as claimed in claim 11 wherein said fitting has an internal bore extending through the fitting from an outer end thereof to an internal end thereof that is received in said counterbore;

said means associated with said fitting for attaching a flow conduit to said fitting comprises a cylindrical nipple extending upwardly from an enlarged cylindrical base, wherein the cylindrical nipple has an outer diameter that slips inside the bore of said fitting and said cylindrical base of said nipple has an outer diameter that fits in said counterbore at the inner end of said counterbore; and said means associated with said fitting for engaging said O-ring comprises an annular, substantially flat surface on the cylindrical base of said nipple that engages said O-ring to form a seal therewith.

14. A reciprocating pump as claimed in claim 11 wherein said fitting has an internal bore extending from an outer end of said fitting to an inner end of said fitting that is received in said counterbore;

said means associated with said fitting for attaching a flow conduit to said fitting comprises screw threads on the cylindrical sidewall of the internal bore in said fitting, wherein a flow conduit having a threaded end can be screwed into the internal bore to form a seal between said flow conduit and the internal bore of said fitting; and said means associated with said fitting for engaging said O-ring comprises an annular, substantially flat surface on the inner end of said fitting that engages said O-ring to form a seal therewith.

15. A reciprocating pump as claimed in claim 1 wherein the pump is of the type having (1) a body made of a fluoroplastic material, with a chamber formed adjacent one side of said body, wherein said chamber is open at said one side of said body, (2) a diaphragm fits over the otherwise open end of said chamber in said one side of said body and (3) a head having a side facing said diaphragm, with a chamber formed in said head adjacent to the side of said head facing said diaphragm, wherein the chamber in said head is open at said side of said head facing said diaphragm and is further substantially concentric with the chamber in said body, an improvement in means for securing said head to said body and sealing said diaphragm between said body and said head, said improvement comprising an O-ring made of resilient, elastomeric material, said O-ring being positioned between said diaphragm and the side of said head facing said diaphragm;

said O-ring having a diameter of sufficient size to encircle the open ends of the chambers in said body and in said head; and spring means exerting a spring force against said head to force said head toward said body and thereby compress said O-ring between said head and said body, whereby any expansion or contraction of the body and head due to temperature fluctuations is accommodated by said spring means without significant loss in compression of the O-ring between said head and said body.

16. A reciprocating pump as claimed in claim 15 wherein an annular recess is formed in said one side of said body so as to encircle said open end of said chamber in said one side of said body; and said annular recess has a depth that is less than the thickness of said O-ring such that said O-ring mates with said annular recess in said one end of said body to force the diaphragm into said annular recess and to seal the diaphragm between said recess and said O-ring.

17. A reciprocating pump as claimed in claim 15 wherein tie bolts extend from said one side of said body through openings in said head and beyond an opposite side of said head facing away from said body;

screw retainers are threaded on end portions of said tie bolts extending beyond the opposite side of said head; and said spring means are positioned between said screw retainers and said opposite side of said head so as to exert spring force on said head when said screw retainers are tightened against said spring means.

18. A reciprocating pump as claimed in claim 17 wherein said spring means comprises a rigid, annular compression ring having openings spaced around said compression ring, said openings aligning with the end portions of said tie bolts that extend beyond the opposite side of said head;

said tie bolts pass through said openings in said compression ring such that said compression ring is positioned between said opposite side of said head and said screw retainers threaded on said end portions of said tie bolts; and an annular spring element is positioned between said compression ring and said opposite side of said head, whereby when said screw retainers are tightened against said compression ring, the compression ring compresses said annular spring element such that a spring force is applied to said opposite side of said head.

19. In a pump of the type having a body made of fluoroplastic material, an improvement in means for attaching a suction or discharge flow conduit to the body of the pump, said improvement comprising a bore extending into said body;

a counterbore having a cylindrical side wall formed into the body concentric with said bore, with a substantially flat annular surface being formed between the counterbore and the bore at an inner end of said counterbore;

internal threads formed on the cylindrical side wall of said counterbore;

an O-ring positioned in said counterbore so as to lie around and along said flat annular surface at the inner end of said counterbore;

a fitting having external threads for engaging said internal threads of said counterbore;

said fitting has an internal bore extending through the fitting from an outer end thereof to an internal end thereof that is received in said counterbore;

said internal bore in said fitting having a flared opening facing the inner end of said counterbore;

means associated with said fitting for attaching a flow conduit to said fitting comprising an insert flare having a cylindrical nipple extending upwardly from an enlarged cylindrical base, wherein the cylindrical nipple has an outer diameter that slips inside the flared opening of the internal bore of said fitting and a flared end of said flow conduit is forced by said flared opening of said fitting against the outer end of said insert flare to make sealing engagement with said insert flare, and further wherein said cylindrical base of said insert flare has an outer diameter that fits in said counterbore at the inner end of said counterbore; and means associated with said fitting for engaging said O-ring so as to form a seal between the fitting and the counterbore comprising an annular, substantially flat surface on the cylindrical base of said insert flare that engages said O-ring to form a seal therewith.

20. In a pump of the type having a body made of fluoroplastic material, an improvement in means for attaching a suction or discharge flow conduit to the body of the pump, said improvement comprising a bore extending into said body;

a counterbore having a cylindrical side wall formed into the body concentric with said bore, with a substantially flat annular surface being formed between the counterbore and the bore at an inner end of said counterbore;

internal threads formed on the cylindrical side wall of said counterbore;

an O-ring positioned in said counterbore so as to lie around and along said flat annular surface at the inner end of said counterbore;

a fitting having external threads for engaging said internal threads of said counterbore;

said fitting has an internal bore extending from an outer end of said fitting to an inner end of said fitting that is received in said counterbore;

means associated with said fitting for attaching a flow conduit to said fitting comprising screw threads on the cylindrical sidewall of the internal bore in said fitting, wherein a flow conduit having a threaded end can be screwed into the internal bore to form a seal between said flow conduit and the internal bore of said fitting; and means associated with said fitting for engaging said O-ring so as to form a seal between the fitting and the counterbore comprising an annular, substantially flat surface on the inner end of said fitting that engages said O-ring to form a seal therewith.

21. In a pump of the type having (1) a body having a chamber formed adjacent one side of said body, wherein said chamber is open at said one side of said body, (2) a head having a side facing said body and a chamber formed in said head adjacent to the side of said head facing said body, wherein the chamber in said head is open at said side of said head facing said body and is further substantially concentric with the chamber in said body and (3) a diaphragm having first and second sides and being positioned between said head and said body, said diaphragm extending over the open end of said chamber in said body and the open end of said chamber in said head, an improvement in means for securing said head to said body and sealing said diaphragm between said body and said head, said improvement comprising a torus ring made of resilient elastomeric material, said torus ring being positioned between said head and said body so that the torus ring is adjacent to and contacts one side of said diaphragm;

said torus ring having a diameter of sufficient size to encircle the open ends of the chambers in said body and in said head, said torus ring further having a thickness sufficient to space the head from the body so that the head does not contact the body but instead floats on said torus ring; and means for drawing said head toward said body so as to compress said torus ring between said head and said body but without having said head contact said body, whereby any expansion or contraction of the body and head due to temperature fluctuations is accommodated by the compression of the torus ring between said head and said body without impairing the sealing of said diaphragm between said body and said head.

22. A pump as claimed in claim 21 wherein an annular recess is formed in a side portion of said pump that is in contact with the second side of said diaphragm, said annular recess encircling said open ends of said chambers in said head and said body; and an annular projection is formed on a side of said torus ring that contacts said diaphragm, with the annular projection on said torus ring mating with said annular recess to force the diaphragm into said annular recess.

23. In pump of the type having (1) a chamber formed adjacent one side of said body, wherein said chamber is open at said one side of said body, (2) a diaphragm fits over the otherwise open end of said chamber in said one side of said body and (3) a head having a side facing said diaphragm and a chamber formed in said head adjacent to the side of said head facing said diaphragm, wherein the chamber in said head is open at said side of said head facing said diaphragm and is further substantially concentric with the chamber in said body, an improvement in means for securing said head to said body and sealing said diaphragm between said body and said head, said improvement comprising an O-ring made of resilient elastomeric material positioned so that the O-ring is located on a side of said diaphragm and between said head and said body;

said O-ring having a diameter of sufficient size to encircle the open ends of the chambers in said body and in said head; and spring means exerting a spring force against said head to force said head toward said body and thereby compress said O-ring between said head and said body, whereby any expansion or contraction of the body and head due to temperature fluctuations is accommodated by said spring means without loosening of the compression on the O-ring between said head and said body.

24. A pump as claimed in claim 23 wherein an annular recess is formed in a portion of said pump that is in contact with said diaphragm, said annular recess encircling said open ends of said chambers in said head and said body; and said annular recess has a depth that is less than the thickness of said O-ring, and said O-ring mates with said annular recess to force the diaphragm into said annular recess.

25. A pump as claimed in claim 23 wherein tie bolts extend from said one side of said body through openings in said head and beyond an opposite side of said head facing away from said body;

screw retainers are threaded on end portions of said tie bolts extending beyond the opposite side of said head; and said spring means are positioned between said screw retainers and said opposite side of said head so as to exert spring force on said head when said screw retainers are tightened against said spring means.

26. A pump as claimed in claim 25 wherein said spring means comprises a rigid, annular compression ring having openings spaced around said compression ring, said openings aligning with the end portions of said tie bolts that extend beyond the opposite side of said head;

said tie bolts pass through said openings in said compression ring such that said compression ring is positioned between said opposite side of said head and said screw retainers threaded on said end portions of said tie bolts; and an annular spring element is positioned between said compression ring and said opposite side of said head, whereby when said screw retainers are tightened against said compression ring, the compression ring compresses said annular spring element such that a spring force is applied to said opposite side of said head.

* * * * *